(12) United States Patent
Olek et al.

(10) Patent No.: US 11,908,653 B2
(45) Date of Patent: Feb. 20, 2024

(54) HIGH VOLTAGE POWER DISTRIBUTOR

(71) Applicant: Aptiv Technologies AG, Schaffhausen (CH)

(72) Inventors: Pawel Olek, Czechowice-Dziedzice (PL); Jakub Walkowski, Jadowniki (PL); Tomasz Slizowski, Cracow (PL); Karol Janicki, Zebrzydowska (PL)

(73) Assignee: Aptiv Technologies AG, Schaffhausen (CH)

( * ) Notice: Subject to any disclaimer, the term of this patent is extended or adjusted under 35 U.S.C. 154(b) by 15 days.

(21) Appl. No.: 17/681,024

(22) Filed: Feb. 25, 2022

(65) Prior Publication Data

US 2022/0392728 A1    Dec. 8, 2022

(30) Foreign Application Priority Data

Mar. 1, 2021    (EP) .................................... 21159999

(51) Int. Cl.
| | | |
|---|---|---|
| H01H 85/54 | (2006.01) | |
| H01R 13/53 | (2006.01) | |
| H01R 13/68 | (2011.01) | |
| H01R 25/14 | (2006.01) | |

(52) U.S. Cl.
CPC ............. *H01H 85/54* (2013.01); *H01R 13/53* (2013.01); *H01R 13/68* (2013.01); *H01R 25/14* (2013.01); *H01R 2201/26* (2013.01)

(58) Field of Classification Search
CPC ........................ H01R 13/68–688; H01R 13/53; H01R 25/14; H01R 2201/26; H01H 85/2035; H01H 85/54

USPC ..................... 439/620.26, 620.28, 620.34
See application file for complete search history.

(56) References Cited

U.S. PATENT DOCUMENTS

| | | | | |
|---|---|---|---|---|
| 5,643,693 | A | * | 7/1997 | Hill ..................... H01M 50/296 429/123 |
| 5,645,448 | A | * | 7/1997 | Hill ..................... H01H 85/205 439/522 |
| 9,178,307 | B2 | | 11/2015 | Papurcu et al. |
| 10,177,493 | B2 | | 1/2019 | Yildiz et al. |
| 2003/0205398 | A1 | | 11/2003 | Sumida et al. |

FOREIGN PATENT DOCUMENTS

| | | |
|---|---|---|
| EP | 2454785 A1 | 5/2012 |
| EP | 2426687 A3 | 8/2012 |
| EP | 1947744 B1 | 5/2013 |
| EP | 3058625 A1 | 8/2016 |
| WO | 2017032762 A1 | 3/2017 |

OTHER PUBLICATIONS

Product Drawing TAB.003.656.AJ; Volkswagen AG; Nov. 18, 2016.

* cited by examiner

*Primary Examiner* — Gary F Paumen
(74) *Attorney, Agent, or Firm* — Billion & Armitage

(57) ABSTRACT

A high voltage power distributor comprises an insulated high voltage power cable, a fuse mechanically connected to a fuse holder and a busbar that is electrically connected between the cable and the fuse. The fuse, the fuse holder, the busbar and the cable are accommodated in a housing.

17 Claims, 2 Drawing Sheets

Figure 1:
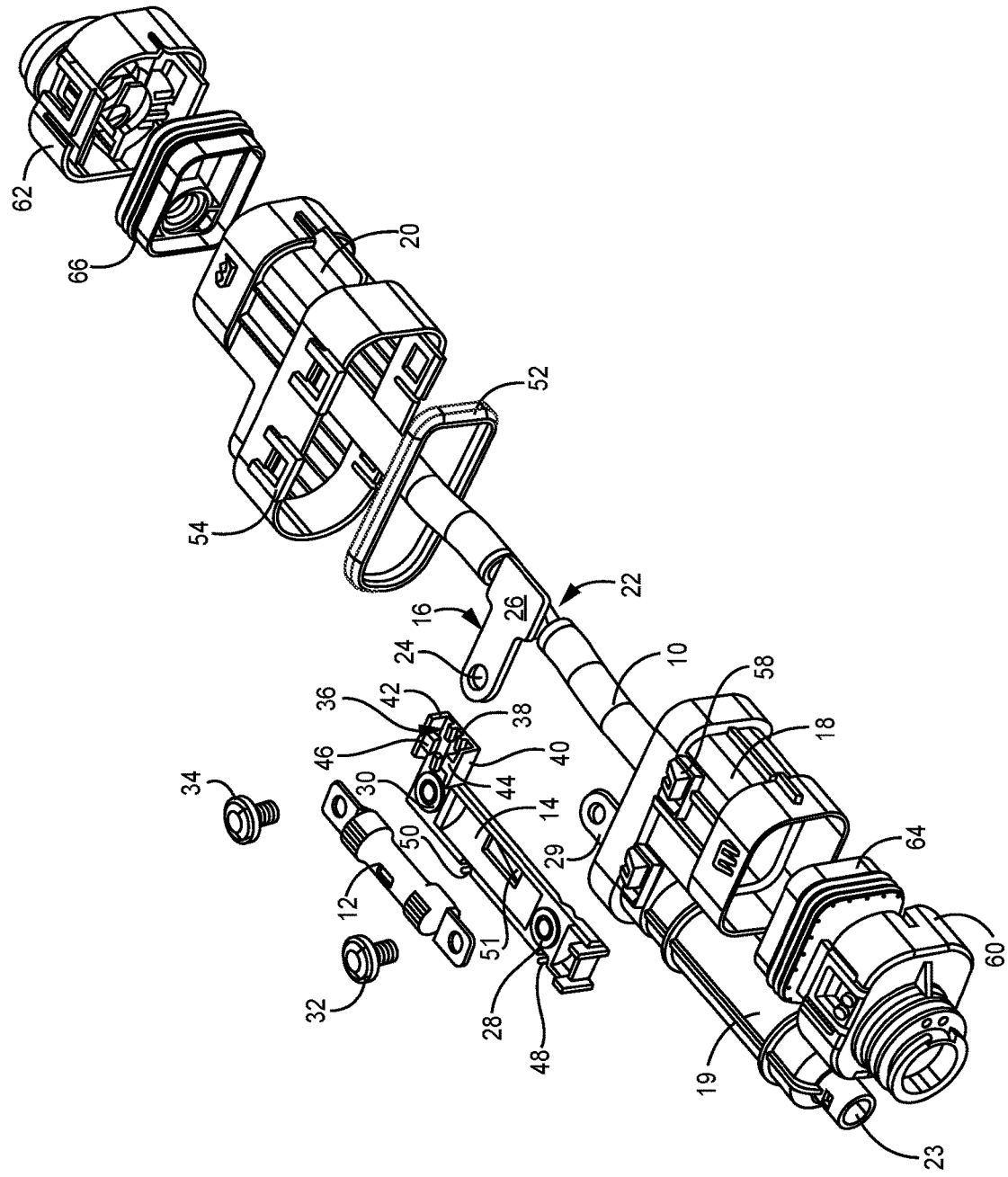

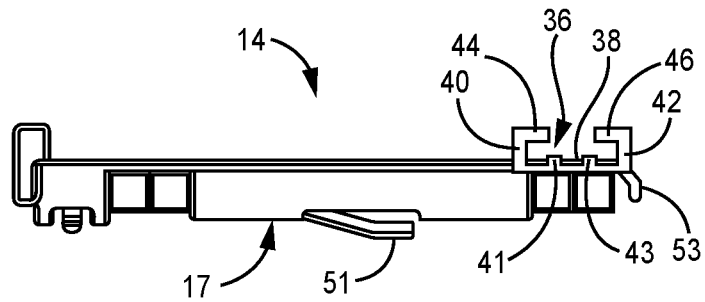
FIG. 2
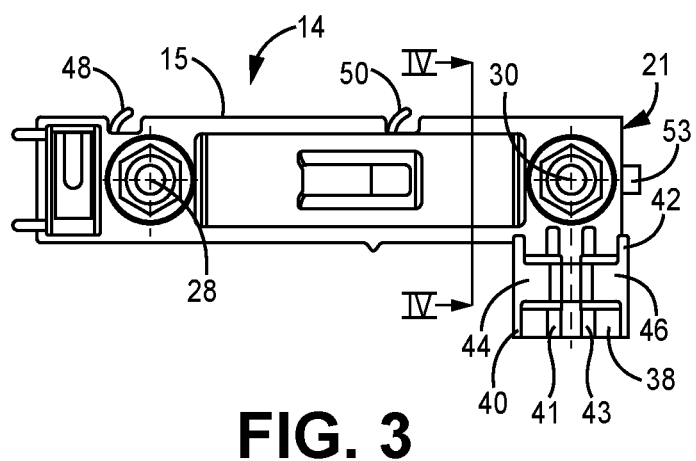 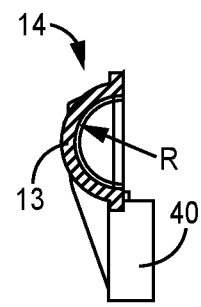
FIG. 3  FIG. 4
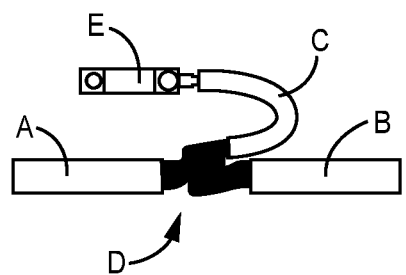
FIG. 5

HIGH VOLTAGE POWER DISTRIBUTOR

FIELD

The present disclosure relates to a high voltage power distributor for providing a high voltage power cable with a spliced and fused power connection for use as a power supply for auxiliary car equipment.

BACKGROUND

The increase in popularity of electric vehicles leads to a rising production for high voltage power cables with specific harness architectures that require a robust and repeatable splicing connection which comprises a high voltage fuse. FIG. 5 shows a conventional solution for a splicing connection of a high-voltage power cable wherein two high-voltage main cables A and B and an auxiliary outlet cable C are connected to each other by means of soldering to form a splice D. The auxiliary outlet cable C having a reduced thickness as compared to the main power cables A and B is soldered at its first end to the splice D and at its second end the auxiliary outlet cable C is connected to a fuse E to which an auxiliary car equipment can be connected. Due to the flexible connection between the main power cables A and B and the fuse E by means of the auxiliary outlet cable C, this splicing connection requires manual assembly work and is prone to rattling.

Accordingly, there is a need to provide a stable and robust solution for a high voltage power distributor which can be manufactured at low cost for use in automotive applications.

SUMMARY

The present disclosure provides a high voltage power distributor and a method for manufacturing a high voltage power distributor according to the independent claims. Embodiments are given in the subclaims, the description and the drawings.

In one aspect, the present disclosure is directed to a high voltage power distributor comprising an isolated high voltage power cable, a fuse mechanically connected to a fuse holder and a busbar that is electrically connected at a first end thereof to the cable and at a second end thereof to the fuse. Further, a housing is provided for accommodating the fuse, the fuse holder, the busbar and at least a portion of the cable.

The high voltage power distributor according to this embodiment provides a stable and robust device comprising only a small number of components thereby allowing a short assembly and process time. Due to the provision of a busbar within the power distributor and between the cable and the fuse a robust assembly is provided which can be used for splicing high voltage cables to provide a power supply for auxiliary car equipment.

According to an embodiment, the cable in the housing is uninterrupted and the busbar is connected to a non-insulated section of the cable. This embodiment avoids to cut the cable and/or to connect two ends of the cable with a third cable leading to the fuse. In this embodiment, it is merely required to connect the busbar to the non-insulated section of the cable for providing a splice such that only one interface between the cable and the busbar is required. Simultaneously, high pullout forces are realized.

According to a further embodiment, the busbar is welded to the cable, for example by means of ultrasonic welding. In this embodiment, it is not necessary to provide a clamp or the like for an electrical connection between the busbar and the cable, and the welding of the busbar to the cable can be performed without manual work. Furthermore, the welding process is simple and does not require a cable bending or a positioning of cable ends.

According to a further embodiment, the fuse holder comprises a slot for receiving an end of the busbar. Due to the provision of a slot the busbar can be located within the fuse holder such that no further adjustment is required in order to connect the busbar and the fuse, for example by means of a screw and nut connection. Furthermore, the accommodation of the busbar within a slot provides a stable fixation of the busbar within the fuse holder.

According to a further embodiment, the slot supports the busbar at four sides thereof which improves the fixation of the busbar within the fuse holder.

According to a further embodiment, at least one biased spring element is provided between the fuse holder and the housing. This provides an anti-vibration solution because the spring elements biases the fuse holder against the housing to exclude a relative movement between the fuse holder and the housing. If the spring forces of at least two spring elements are oriented perpendicular to each other, any vibration is effectively avoided. According to an embodiment the spring element is connected to the fuse holder, for example integrally molded with the fuse holder.

According to a further embodiment, the fuse holder is L-shaped such that the busbar and the fuse may be oriented under an angle of 90° to each other. If this is the case, the fuse holder and the fuse can be arranged in parallel with the cable wherein the busbar extends transverse to the cable and the fuse.

According to a further embodiment, the cable extends in a substantially straight line through the housing. This facilitates the manufacture of the device, avoids any unwanted bending and allows for a compact design of the distributor.

According to a further embodiment, the busbar comprises an enlarged welding platform. Such welding platform can for example be provided by an enlarged width of the busbar at this end of the busbar which is welded to the cable, as compared to the other end of the busbar which is connected to the fuse.

According to a further embodiment, the fuse is rigidly connected to the cable, for example by means of the busbar such that a robust and stable assembly of the cable, the busbar and the fuse is achieved. This is in contrast to a flexible connection, e.g. by means of a cable.

In another aspect, the present disclosure is directed at a method of manufacturing a high voltage power distributor as described above, wherein an insulation of an insulated high voltage power cable is partly removed, a busbar is electrically connected at a first end thereof to the non-insulated section of the cable and at a second end thereof to a fuse. Further, the fuse is connected to a fuse holder and the cable, the busbar, the fuse and the fuse holder are accommodated in a housing.

According to an embodiment, the busbar is inserted into a slot of the fuse holder before establishing the electrical connection between the busbar and the fuse.

According to a further embodiment, the fuse holder and the fuse are inserted into the housing while biasing a spring element between the fuse holder and the housing.

DRAWINGS

Exemplary embodiments and functions of the present disclosure are described herein in conjunction with the drawing, showing schematically in FIG. 1 an exploded view of a high voltage power distributor;

FIG. 2 a side view of a fuse holder;

FIG. 3 a top view of the fuse holder of FIG. 2;

FIG. 4 a cross-section along the line IV-IV of FIG. 3; and

FIG. 5 a prior art splice solution.

DETAILED DESCRIPTION

FIG. 1 depicts an exploded view of a high voltage power distributor for use in automotive applications comprising an isolated high voltage power main cable 10, a fuse 12 mechanically connected to a fuse holder 14 and a busbar 16 that is electrically connected at a first end thereof to the main cable 10 and at a second end thereof to the fuse 12. Furthermore, a housing is provided that comprises two parts 18 and 20 and accommodates the fuse 12, the fuse holder 14, the busbar 16 and at least a portion of the main cable 10. Although FIG. 1 illustrates that the main cable 10 does not extend outside of the housing, is evident that the main cable 10 can be led through the housing such as to extend through the outer ends of the housing. In other embodiments the main cable 10 can be provided with terminals for connecting the main cable 10 to other cables.

As shown in FIG. 1, the main cable 10 is generally insulated and extends continuously through the housing 18, 20 along a substantially straight line. However, the main cable 10 comprises a non-insulated section 22 where the insulation has been removed and the busbar 16 is welded to this non-insulated section 22, for example by means of ultrasonic welding.

The busbar 16 is made of metal and is generally strip-shaped with a mounting hole 24 provided at one end of the busbar. At the other end of the busbar a welding platform 26 is provided having the shape of a rectangle and having an enlarged width as compared to the strip-shaped remainder of the busbar 16.

The fuse holder 14 is integrally formed of an electrically insulating material, wherein two nuts 28 and 30 are overmolded to receive respectively one screw 32 and 34 for mounting the fuse 12 to the fuse holder 14.

As shown in FIGS. 1 and 3, the fuse holder 14 is generally L-shaped wherein one (longer) limb of the L receives the fuse 12 and the other (shorter) limb provides a slot 36 for receiving an end of the busbar 16. The slot 36 has a rectangular cross-section which corresponds to the cross-section of the busbar 16 whereby the slot 36 supports the busbar 16 at four sides thereof. The slot 36 is formed by a base 38, two sidewalls 40 and 42 and two wings 44 and 46 that prevent a rotation of the busbar 16 relative to the fuse holder 14.

As illustrated in FIGS. 2 and 3 the base 38 of the slot 36 is provided with two parallel slide rails 41 and 43 for supporting the bus bar. When the bus bar 16 is inserted into the slot 36, the wings 44 and 46 are slightly biased such that the bus bar 16 is pressed against the slides 41 and 43.

Further, it can be seen that the busbar 16 can be inserted into the slot 36 of the fuse holder 14 until the mounting hole 24 is aligned with a through-hole of the fuse 12 in order to allow the screw 34 to be inserted through the fuse 12 and the busbar 16 for connection with the nut 30. Similarly, the screw 32 is used to connect a terminal 29 of an auxiliary outlet cable (not shown) with the fuse 12 when the screw 32 is screwed into the nut 28. The auxiliary outlet cable can exit the cylindrical section 19 of the housing 18 through an outlet opening 23.

As can be taken from FIG. 1, housing part 18 comprises a cylindrical section 19 adapted to receive the assembly of the terminal 29, the fuse holder 14 and the fuse 12. To avoid a relative movement of this assembly within the cylindrical section 19 of the housing part 18 the fuse holder 14 is provided at one side wall 15 (FIG. 3) thereof with integrally formed spring elements 48 and 50. A further spring element 51 is provided at an adjacent side wall 17 of the fuse holder wherein the spring forces of the two spring elements 48 and 50 on the one hand and of the spring element 51 on the other hand are oriented perpendicular to each other, to exclude an vibration of the fuse and the fuse holder relative to the housing. A further spring element 53 (FIGS. 2 and 3) is provided at a third sidewall 21 (FIG. 3) of the fuse holder 14. This spring element 53 urges against a wall of the housing part 20 when the housing is fully closed such to avoid a movement of the fuse holder 14 and the fuse 12 within the housing.

As shown in FIG. 4 the fuse holder 14 comprises a receptacle 13 having a semi-circular cross-section with a radius R for accommodating the fuse 12.

For providing a watertight sealing, a single one-piece seal 52 is inserted between the two housing parts 18 and 20 which can be connected to each other by means of clips 54 at the housing part 20 to engage hooks 56 at the housing part 18. Finally, covers 60 and 62 can be clipped onto the housing parts 18 and 20 with a seal 64 and 66 being provided between each cover 60, 62 and the housing parts 18 and 20.

For manufacturing the above-described high voltage power distributor, the insulation of the insulated high voltage power main cable 10 is partly removed to provide the non-insulated section 22. Thereafter, this section 22 is welded to the welding platform 26 of the busbar 16 wherein the busbar is oriented generally rectangular in relation to the main cable 10, as shown in FIG. 1. Thereafter, the busbar 16 is inserted into the slot 36 of the fuse holder 14 and the fuse 12 is electrically connected to the busbar 16 by screwing the screw 34 into the nut 30. This also provides a fixed and reliable mechanical connection between the busbar 16, the fuse holder 14 and the fuse 12. At the other end of the fuse 12 the screw 32 is used to connect the terminal 29 of an auxiliary outlet cable with the fuse 12 and to provide also a mechanical connection between the fuse 12 and the fuse holder 14.

Thereafter, a stable assembly is provided that comprises the main cable 10, the busbar 16, the fuse holder 14, the fuse 12 and the terminal 29. This assembly is thereafter inserted into the housing part 18 while biasing the spring elements 48, 50 and 51 between the fuse holder 14 and the housing part 18.

Finally, the housing can be closed by clipping the housing part 20 onto the housing part 18.

The disclosed power distributor provides versatile outlets for main power cables having a cross-section of 25 mm$^2$, 35 mm$^2$, 50 mm$^2$, 70 mm$^2$ or 95 mm$^2$. The outlet opening 23 for the auxiliary outlet cable may be designed to accommodate auxiliary outlet cables having a cross-section of 4 mm$^2$ or 6 mm$^2$. The fuse may have a value of 40 A.

The invention claimed is:

1. A high voltage power distributor, comprising:
   an insulated high voltage power cable,
   a fuse mechanically connected to a fuse holder;
   a busbar that is electrically connected at a first end thereof to the cable and at a second end thereof to the fuse; and
   a housing accommodating the fuse, the fuse holder, the busbar and at least a portion of the cable, wherein a first biased spring element is provided between the fuse holder and the housing configured to inhibit a movement of the fuse holder relative to the housing.

2. The high voltage power distributor according to claim 1, wherein the cable in the housing is uninterrupted and the busbar is connected to a non-insulated section of the cable.

3. The high voltage power distributor according to claim 1, wherein the busbar is welded to the cable.

4. The high voltage power distributor according to claim 1, wherein the fuse holder comprises a slot for receiving an end of the busbar.

5. The high voltage power distributor according to claim 4, wherein the slot supports the busbar at four sides thereof.

6. The high voltage power distributor according to claim 1, wherein a second biased spring element is provided between the fuse holder and the housing and wherein spring forces of the first and second spring elements are oriented perpendicular to each other.

7. The high voltage power distributor according to claim 1, wherein the fuse holder is L-shaped.

8. The high voltage power distributor according to claim 1, wherein the cable extends in a substantially straight line through the housing.

9. The high voltage power distributor according to claim 1, wherein the busbar extends transverse to the cable.

10. The high voltage power distributor according to claim 1, wherein the busbar comprises an enlarged welding platform.

11. The high voltage power distributor according to claim 1, wherein the fuse is rigidly connected to the cable.

12. The high voltage power distributor according to claim 1, wherein the housing further accommodates an auxiliary outlet cable and a terminal of the auxiliary outlet cable and wherein the auxiliary outlet cable exits the housing through an outlet opening.

13. A method of manufacturing a high voltage power distributor, comprising:

partly removing an insulation of an insulated high voltage power cable;

electrically connecting a first end of a busbar to a section of the cable from which the insulation was removed and a second end of the busbar to a fuse;

connecting the fuse to a fuse holder; and accommodating the cable, the busbar, the fuse, and the fuse holder in a housing; and providing a first biased spring element between the fuse holder and the housing configured to inhibit a movement of the fuse holder relative to the housing.

14. The method according to claim 13, wherein the busbar is inserted into a slot of the fuse holder before establishing the electrical connection between the busbar and the fuse.

15. The method according to claim 13, wherein the fuse holder and the fuse are inserted into the housing while biasing the first spring element between the fuse holder and the housing.

16. The method according to claim 15, further compromising:

providing a second biased spring element between the fuse holder and the housing; and biasing the second spring element between the fuse holder and the housing such that spring forces of the first and second spring elements are oriented perpendicular to each other.

17. The method according to claim 13, further compromising:

connecting a terminal of an auxiliary outlet cable to the fuse; and accommodating the auxiliary outlet cable and the terminal of the auxiliary outlet cable within the housing, wherein the auxiliary outlet cable exits the housing through an outlet opening.

\* \* \* \* \*